(12) United States Patent
Schroeder et al.

(10) Patent No.: US 11,352,211 B2
(45) Date of Patent: Jun. 7, 2022

(54) CONVEYOR BELT WITH FLOW CONTROL CLEATS

(71) Applicant: WCCO Belting, Inc., Wahpeton, ND (US)

(72) Inventors: Michael B. Schroeder, Wahpeton, ND (US); Travis Mackey, Wahpeton, ND (US); Zach Kosienski, Wahpeton, ND (US)

(73) Assignee: WCCO Belting, Inc., Wahpeton, ND (US)

( * ) Notice: Subject to any disclaimer, the term of this patent is extended or adjusted under 35 U.S.C. 154(b) by 0 days.

(21) Appl. No.: 17/181,317

(22) Filed: Feb. 22, 2021

(65) Prior Publication Data

US 2021/0284453 A1    Sep. 16, 2021

Related U.S. Application Data

(60) Provisional application No. 62/987,941, filed on Mar. 11, 2020.

(51) Int. Cl.
| | |
|---|---|
| *B65G 15/44* | (2006.01) |
| *B65G 43/00* | (2006.01) |
| *B65G 15/34* | (2006.01) |
| *B65G 15/42* | (2006.01) |

(52) U.S. Cl.
CPC ............. *B65G 15/44* (2013.01); *B65G 15/34* (2013.01); *B65G 15/42* (2013.01); *B65G 43/00* (2013.01); *B65G 2201/042* (2013.01)

(58) Field of Classification Search
CPC ........ B65G 15/42; B65G 15/44; B65G 15/34; B65G 43/00; B65G 2201/042
USPC ............................................ 198/690.2, 699.1
See application file for complete search history.

(56) References Cited

U.S. PATENT DOCUMENTS

| | | | | |
|---|---|---|---|---|
| 4,426,926 | A * | 1/1984 | Soteropulos | A01F 15/07 100/88 |
| 6,371,280 | B1 * | 4/2002 | Lindner | A01F 15/18 198/690.2 |
| 10,617,060 | B2 * | 4/2020 | Hasenour | A01D 41/14 |
| 2002/0175055 | A1 * | 11/2002 | Ryde | B65G 15/42 198/847 |
| 2014/0220208 | A1 | 8/2014 | Kodali | |
| 2014/0262692 | A1 | 9/2014 | Williamson | |

(Continued)

FOREIGN PATENT DOCUMENTS

WO    1999/050159 A1    10/1999

OTHER PUBLICATIONS

International Search Report and Written Opinion received for PCT Serial No. PCT/US2021/019006 dated May 4, 2021, 9 pgs.

*Primary Examiner* — James R Bidwell
(74) *Attorney, Agent, or Firm* — Michael A. Bondi; Moss & Barnett (57) ABSTRACT

A conveyor belt with flow control cleats including belting, a first set of cleats and a second set of cleats. The belting has a first side edge and a second side edge. The first set of cleats has a plurality of first cleat sections. The first set of cleats are oriented at a first acute angle with respect to the first side edge. The second set of cleats has a plurality of second cleat sections. The second set of cleats are oriented at a second acute angle with respect to the second side edge.

20 Claims, 4 Drawing Sheets

(56) References Cited

U.S. PATENT DOCUMENTS

2015/0086690 A1* 3/2015 Kodali ................... A23N 15/04
426/484
2018/0352742 A1 12/2018 Hasenour

* cited by examiner

Prior Art

FIG. 4

CONVEYOR BELT WITH FLOW CONTROL CLEATS

REFERENCE TO RELATED APPLICATION

This application claims priority to Provisional Applic. No. 62/987,941, filed on Mar. 11, 2020, the contents of which are incorporated herein by reference.

FIELD OF THE INVENTION

The invention relates generally to conveyor belts. More particularly, the invention relates to conveyor belts with flow control cleats.

BACKGROUND OF THE INVENTION

Because of their ability to move large amounts of material, conveyors have long been used in industry such as for moving agricultural products, rocks and other mined materials and various manufactured products.

In many situations, the conveyors include a plurality of cleats that extend from the surface thereof in a spaced-apart configuration. The cleats enhance the amount of product that can be moved using the conveyor as compared to conveyor configurations that do not include cleats.

One area in which conveyors are extensively used is equipment for moving agricultural products because the conveyor minimizes the potential damage to the agricultural products.

One challenge with prior art conveyors is that while it is desirable for the product being conveyed on the conveyor to be dispersed across the width of the conveyor, it is also desirable to minimize the potential of the product falling off the sides of the conveyor.

Figure 4:
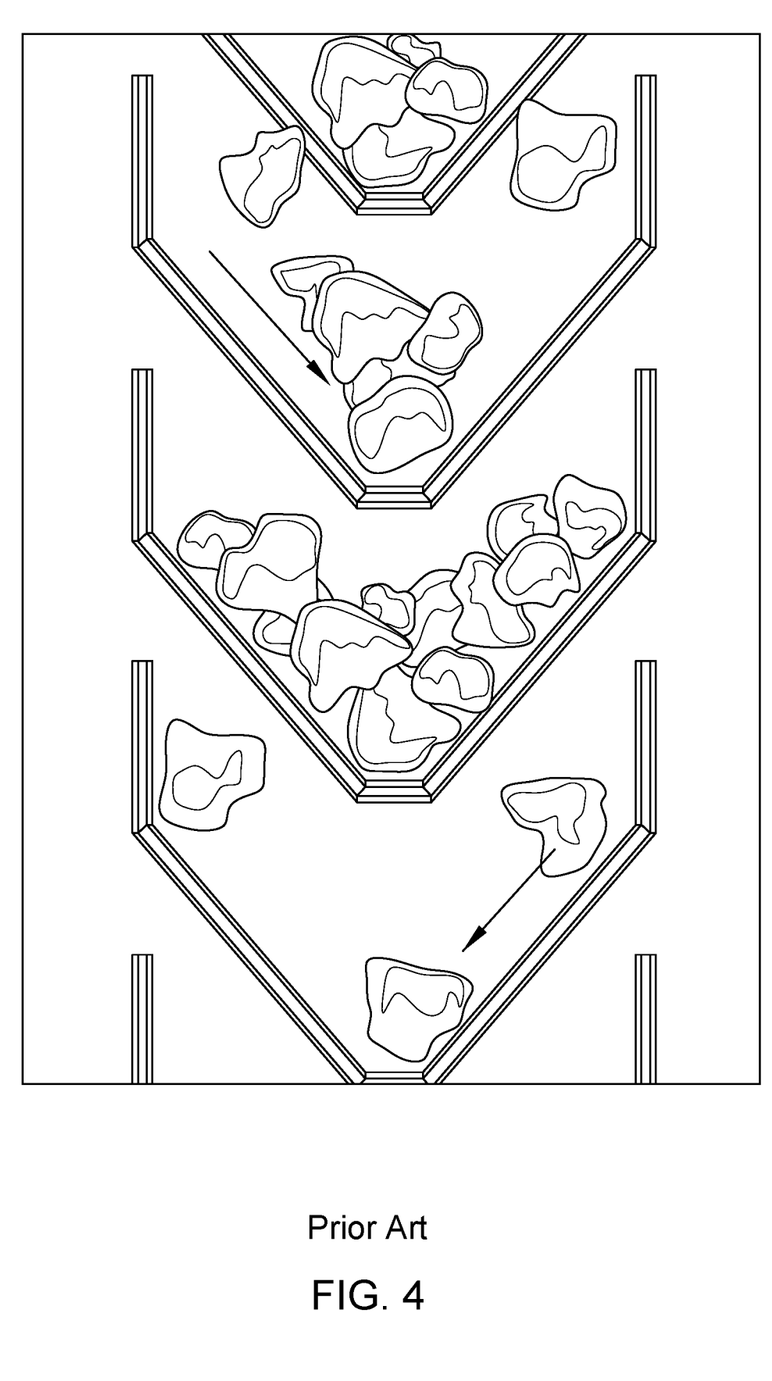
FIG. 4 is a top view of a prior art conveyor belt.

The conveyor belt illustrated in FIG. 4 has a generally V-shaped cleat that while minimizing the potential of objects falling off the sides of the conveyor, permits the objects to move with respect to the conveyor belt, which increases wearing of the belting and the cleats. This prior art conveyor belt also permits the objects to contact each other and such contact can result in damage of the objects.

SUMMARY OF THE INVENTION

An embodiment of the invention is directed to conveyor belt with flow control cleats that includes belting, a first set of cleats and a second set of cleats. The belting has a first side edge and a second side edge. The first set of cleats has a plurality of first cleat sections. The first set of cleats are oriented at a first acute angle with respect to the first side edge. The second set of cleats has a plurality of second cleat sections. The second set of cleats are oriented at a second acute angle with respect to the second side edge.

Another embodiment of the invention is directed to a method of reducing chatter when moving objects using a conveyor belt. A conveyor belt is provided that includes belting, a first set of cleats and a second set of cleats. The belting has a first side edge and a second side edge. The first set of cleats and the second set of cleats are attached to the belting. The first set of cleats has a plurality of first cleat sections. The first set of cleats are oriented at a first acute angle with respect to the first side edge. The second set of cleats has a plurality of second cleat sections. The second set of cleats are oriented at a second acute angle with respect to the second side edge. Objects are placed on the conveyor belt so that the objects are at least partially on the belting. The conveyor belt is moved with respect to a support structure having a roller at one end over which the conveyor belt passes.

Another embodiment of the invention is directed to a method of decreasing roll resistance when moving objects using a conveyor belt. A conveyor belt is provided that includes belting, a first set of cleats and a second set of cleats. The belting has a first side edge and a second side edge. The first set of cleats and the second set of cleats are attached to the belting. The first set of cleats has a plurality of first cleat sections. The first set of cleats are oriented at a first acute angle with respect to the first side edge. The second set of cleats has a plurality of second cleat sections. The second set of cleats are oriented at a second acute angle with respect to the second side edge. Objects are placed on the conveyor belt so that the objects are at least partially on the belting. The conveyor belt is moved with respect to a support structure having a roller at one end over which the conveyor belt passes.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION OF THE INVENTION

Figure 1:
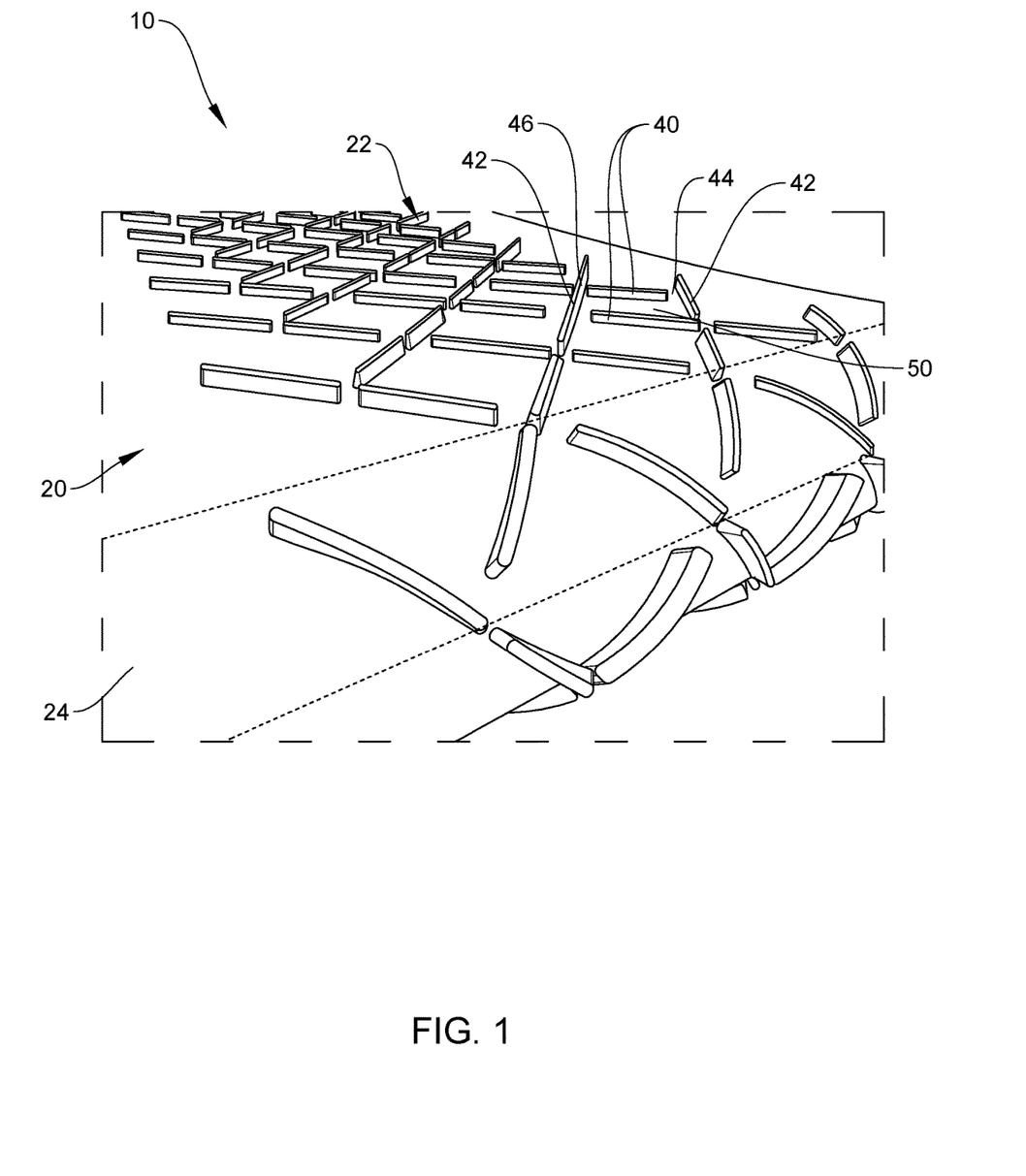
FIG. 1 is a perspective view of a conveyor belt with flow control cleats where the conveyor belt is moving around a roller at an end of the conveyor.
Figure 2:
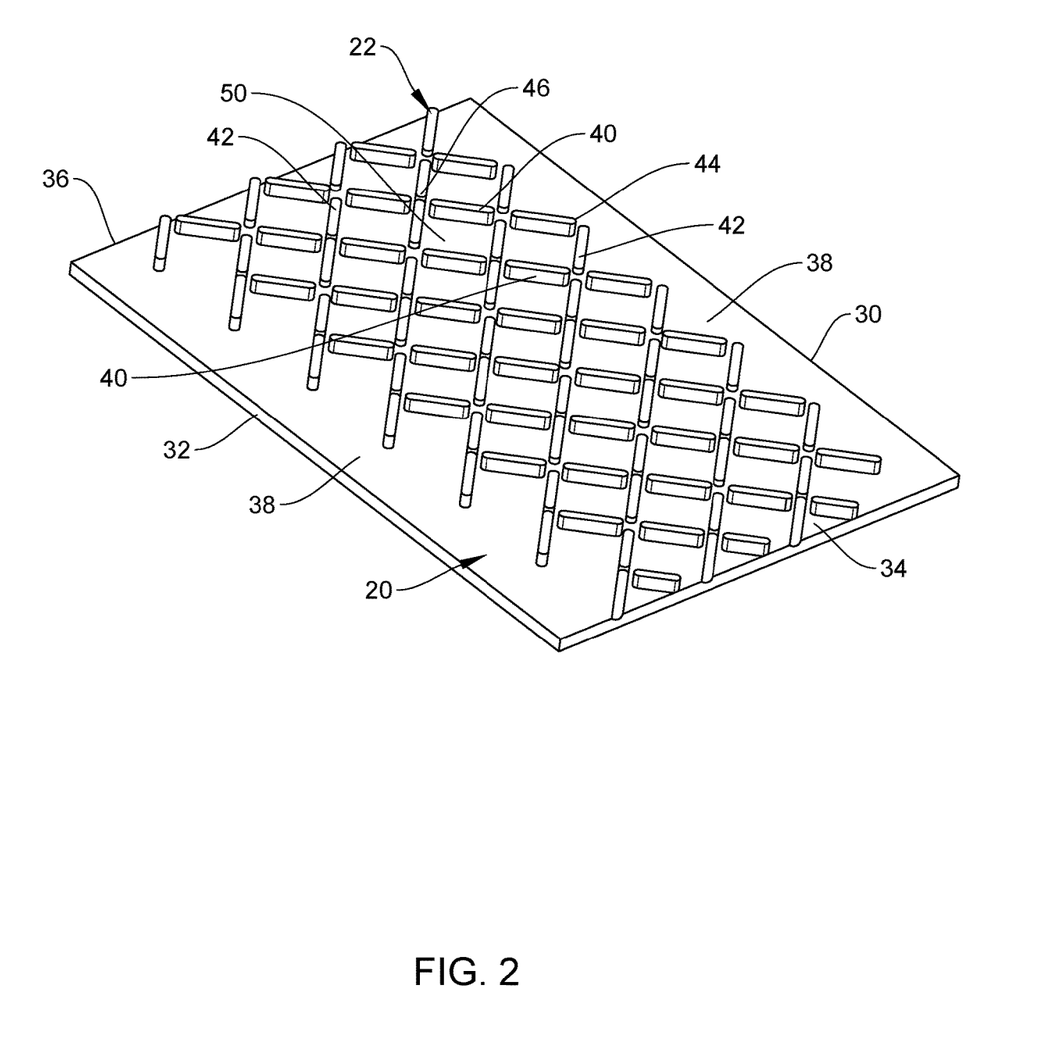
FIG. 2 is a top view of the conveyor belt.
Figure 3:
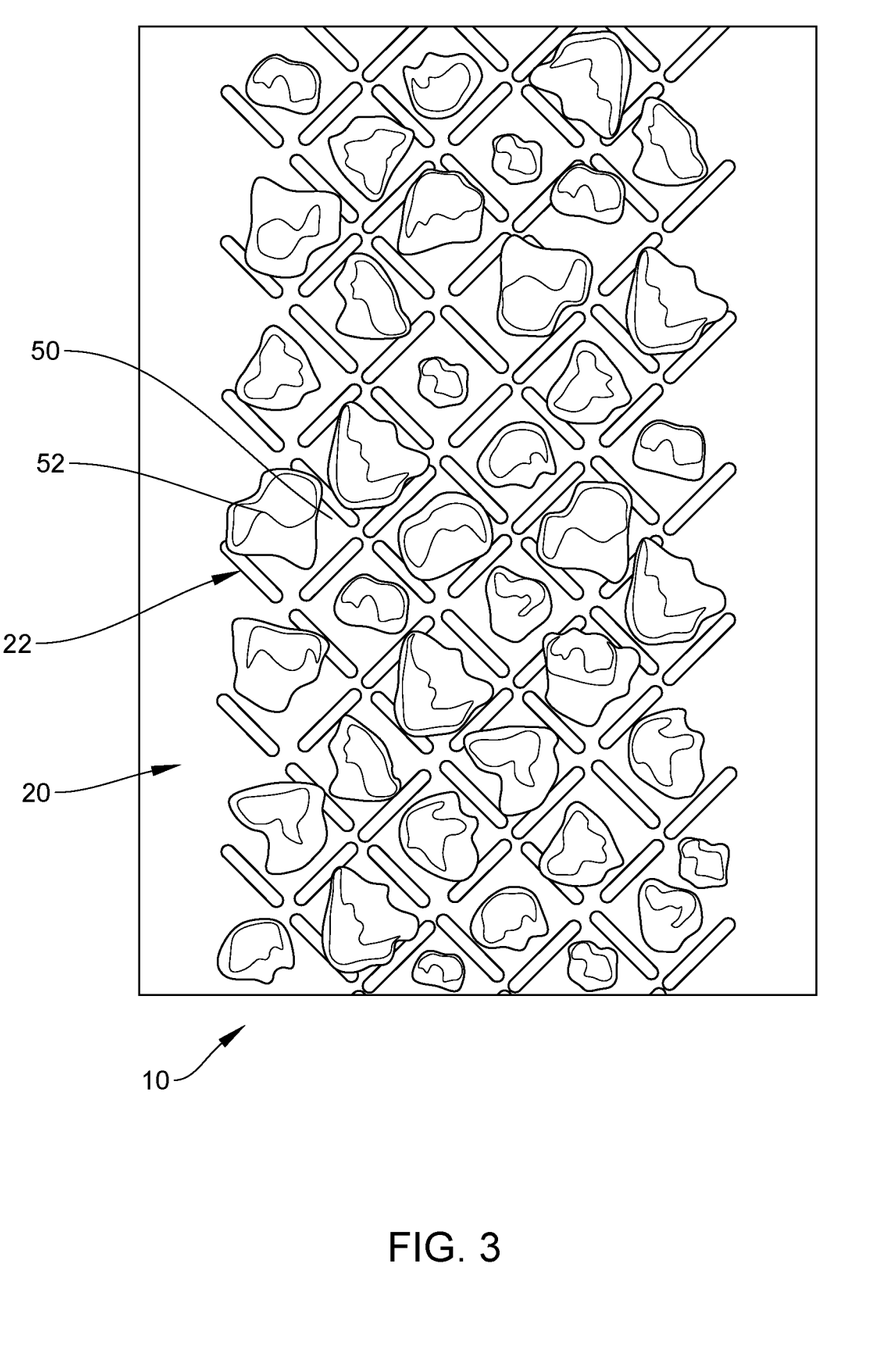
FIG. 3 is a top view of the conveyor belt with product placed thereon.

An embodiment of the invention is directed to a conveyor belt with flow control cleats as illustrated at 10 in FIGS. 1-3. The conveyor belt 10 has enhanced properties as compared to prior art conveyor belts, an example of one such prior art conveyor belt cleat configuration is set forth in FIG. 4.

The conveyor belt 10 has an increased operational capacity as compared to prior art conveyors because the conveyor belt 10 facilitates placing more product across a width of the conveyor belt as compared to prior art conveyor belts such as illustrated in FIG. 4.

The conveyor belt 10 reduces movement of product placed thereon by retaining the product in place on the conveyor belt 10. The cleat configuration also reduces spill back of the product. These traits reduce abrasion of the upper surface of the belting, which increases the useful life of the conveyor belt 10.

As is described in more detail herein, the cleat pattern enhances contact of the belt with the rollers at opposite ends of the conveyor belt 10, which provides a smoother return of the belting. The cleat pattern also reduces chatter during the operation of the conveyor. The cleat pattern provides reduced rolling resistance and decreased horsepower requirements while facilitating the use of lighter yet stronger and more flexible belting.

The conveyor belt 10 generally includes belting 20 to which a plurality of cleats 22 are attached. The belting 20 includes a first side edge 30 and a second side edge 32, which may be oriented generally parallel to the first side edge 30.

The belting 20 is defined by a leading edge 34 and a trailing edge 36. The leading edge 34 is located in a direction in which the belting 20 typically moves. The trailing edge 36 is opposite the leading edge 34.

The belting 20 generally include two primary components: (1) a fabric layer and (2) a rubber layer. The type of the fabric layer as well as the thickness of the fabric layer is selected based upon the material that is intended to be transported using the conveyor belt 10 as well as the volume of material that is intended to be transported on the conveyor belt 10.

There are two primary techniques in which the fabric layer is coated with rubber—skim coating and friction coating. With skim coating, a layer of rubber material is laid on the fabric layer but is not forced into the weave on the fabric layer. In contrast, friction coating applies rubber to a fabric layer using a calender with rolls running at different surface speeds to urge the rubber into the weave on the fabric layer. It is also possible to use the concepts of this invention with uncoated fabric.

While skim coating is typically viewed as being suitable for use in conjunction with a variety of fabrics, the layer of rubber provided by skim coating is typically much thicker than the layer of rubber that is provided by friction coating.

The thicker rubber layer produced from skim coating increases the weight of the conveyor belt on which the skim coat is used. This extra weight may restrict the capacity of the conveyor belt that contains the skim-coated rubber. Alternatively, the components of the conveyor belt that contains the skim-coated rubber may need to be fabricated with a higher capacity.

Depending on the intended use of the belting material, it is possible to coat one or both of the fabric layer surfaces with rubber. It is also possible to use different coating techniques during the coating process. For example, friction coating may be used on one side of the fabric layer and skim coating may be used on the other side of the fabric layer.

While it is possible for the concepts of the invention to be used in conjunction with various rubber compositions, in certain embodiments, the rubber coating contains styrene butadiene rubber as a primary rubber component.

Prior to coating the fabric layer with rubber, the fabric layer may be treated to enhance the rubber adhesion, an example of which includes applying a layer of resorcinol formaldehyde latex to the surface of the fabric layer. After the rubber has been coated on the fabric layer, it is possible to use additional techniques to increase the strength and/or durability of the rubber, examples of which include pressure and heat, which is conventionally referred to as vulcanizing.

The cleats 22 may be attached to the belting 20 either during the process of fabricating the conveyor belt 10 or may be attached to the belting 20 after fabrication. Integrally molding the cleats 22 to the belting 20 may enhance adhesion of the cleats 22 to the belting 20 and reduce the potential of delamination or cleat separation.

Factors impacting the manner in which the cleats 22 are attached to the belting 20 include the materials from which the cleats 22 are fabricated and the likely need to replace the cleats 22 during the useful life of the conveyor belt 10.

The cleats 22 are positioned to extend at least partially between the first side edge 30 and the second side edge 32. In certain embodiments, an edge region 38 of the belting 20 proximate the first side edge 30 and the second side edge 32 does not have any cleats extending therefrom. Each edge region 38 may be up to about 20 percent of the width of the belting 20. In certain embodiments, each edge region 38 has a width of about 10 percent of the width of the belting 20.

The cleats 22 may generally include a first cleat section 40 and a second cleat section 42. The first cleat section 40 may be oriented generally perpendicular to the second cleat section 42. A person of skill in the art will appreciate that the orientation of the first cleat section 40 and the second cleat section 42 with respect to each other may be varied using the concepts of the invention.

Additionally, while it is illustrated that the first cleat section 40 and the second cleat section 42 have a similar length, it is possible for the first cleat section 40 and the second cleat section 42 to be formed with different lengths.

While it is illustrated that the first cleat section 40 and the second cleat section 42 are both substantially straight, it is possible for at least one of the first cleat section 40 and the second cleat section 42 to have other shapes.

While it is illustrated that a surface of the first cleat section 40 and the second cleat section 42 is relatively smooth, it is possible for the concepts of the invention to be adapted to utilize textured surfaces on at least one of the first cleat section 40 and the second cleat section 42. Such textured surface would engage the surface of the object 52 and thereby further reduce movement of the object 52 with respect to the conveyor belt 10.

A plurality of the first cleat sections 40 may be placed in alignment with each other to form a line. The cleats 22 may include a plurality of lines of the first cleat sections 40. The lines of the first cleat sections 40 are positioned in a spaced-apart configuration. In certain embodiments, the spacing between adjacent lines of the first cleat sections 40 may be approximately equal.

The first cleat sections 40 are positioned in the line of the first cleat sections 40 so that a spacing 44 is provided between ends of adjacent first cleat sections 40. The spacing between the ends of the adjacent first cleat sections 40 may be considerably less than a length of each of the first cleat sections 40.

In certain embodiments, the spacing between the ends of the adjacent first cleat sections 40 may be up to about 10 percent of the length of each of the first cleat sections 40. In other embodiments, the spacing between the ends of the adjacent first cleat sections 40 may be about 5 percent of the length of each of the first cleat sections 40.

The line of the first cleat sections 40 may be oriented at an angle of between about 30 degrees and about 60 degrees with respect to the first side edge 30. In certain embodiments, the angle of the line of the first cleat sections 40 may be about 45 degrees with respect to the first side edge 30. In certain embodiments, the line of the first cleat sections 40 may be oriented when moving from the first side edge 30 to the second side edge 32 in a direction that is towards the leading edge 34.

Similarly, a plurality of the second cleat sections 42 may be placed in alignment with each other to form a line. The cleats 22 may include a plurality of lines of the second cleat sections 42. The lines of the second cleat sections 42 are positioned in a spaced-apart configuration. In certain embodiments, the spacing between adjacent lines of the second cleat sections 42 is approximately equal. Additionally, the spacing between the adjacent lines of the first cleat section 40 may be approximately the same as the spacing between the adjacent lines of the second cleat sections 42.

The second cleat sections 42 are positioned in the line of the second cleat sections 42 so that a spacing 46 is provided between ends of adjacent second cleat sections 42. The spacing between the ends of the adjacent second cleat sections 42 may be considerably less than a length of each of the second cleat sections 42.

In certain embodiments, the spacing between the ends of the adjacent second cleat sections 42 may be up to about 10 percent of the length of each of the second cleat sections 42. In other embodiments, the spacing between the ends of the adjacent second cleat sections 42 is about 5 percent of the length of each of the second cleat sections 42.

The line of the second cleat sections 42 may be oriented at an angle of between about 30 degrees and about 60 degrees with respect to the second side edge 32. In certain embodiments, the angle of the line of the second cleat sections 42 may be about 45 degrees with respect to the second side edge 32. In certain embodiments, the line of the second cleat sections 42 is oriented when moving from the second side edge 32 to the first side edge 30 in a direction that is towards the leading edge 34.

A person of skill in the art will appreciate that the concepts of the invention may be varied so that at least one of the first cleat sections 40 and the second cleat sections 42 are not aligned in a line as long as the first cleat sections 40 and the second cleat section 42 define recesses 50 as described in more detail herein Two first cleat sections 40 that extend between two second cleat sections 42 define a recess 50. When the first cleat sections 40 are oriented at the angle of about 45 degrees with respect to the first side edge 30 and the second cleat sections 42 are oriented at the angle of about 45 degrees with respect to the second side edge 32, the recess 50 has a generally square shape. A person of skill in the art will appreciate that the concepts of the invention may be adapted for the recess 50 to have alternate shapes by changing the orientation of at least one of the first cleat section 40 and the second cleat section 42.

The recess 50 is adapted to at least partially receive an object 52 that is being transported on the conveyor belt 10 such that at least a portion of the object 52 rests on the belting 20. The first cleat sections 40 and the second cleat sections 42 that are adjacent to the recess 50 resist movement of the object 52 on the conveyor belt 10.

The recess 50 is selected with a size based upon the size of the object 52 that is intended to be used in conjunction with the conveyor belt 10. In certain embodiments, the object 52 has dimensions that are smaller than the spacing between the first cleat sections 40 and the second cleat sections 42.

In other embodiments, the object 52 has at least one dimension that is greater than the spacing between adjacent first cleat sections 40 and/or adjacent second cleat sections 42. In such situations, a portion of the object extends over at least one of the first cleat sections 40 and the second cleat sections 42.

A substantial portion of each object 52 fits within each recess 50. As used herein, a substantial portion of each object 52 fitting within each recess 50 means that greater than about 80 percent of a length of the object 52 fits within the recess 50 and greater than about 80 percent of a width of the object 52 fits within the recess 50. Using the preceding configuration for the recess 50 minimizes the potential of the object 52 moving from the recess 50 once the object 52 is positioned in the recess 50

As illustrated in FIG. 3, the objects 52 may have irregular shapes meaning that the objects 52 do not have dimensions that are approximately equal in two generally perpendicular directions.

Therefore, the first cleat sections 40 and the second cleat sections 42 are selected so that the substantial portion of each object 52 fits within each recess 50. However, it will be appreciated that the object 52 may be positioned on the conveyor belt 10 in a variety of orientations that are not generally aligned with the first cleat section 40 and/or the second cleat section 42.

Notwithstanding, movement of the object 52 on the conveyor belt 10 is restricted by the first cleat sections 40 and the second cleat sections 42 that extend around the recess 50.

Because the substantial portion of each object 52 fits within each recess 50, the object 52 primarily rests on the surface of the belting 20 as opposed to resting on the cleat 22. Such a configuration facilitates the cleat 22 resisting movement of the object 52 with respect to the conveyor belt 10.

While it is illustrated that one object 52 is placed in each recess 50, it is possible for the concepts of the invention to be adapted so that more than one object 52 is placed in each recess 50.

The first cleat section 40 and the second cleat section 42 are formed with a height that is selected based upon the size of the objects 52 that are intended to be used with the conveyor belt 10. The height of the first cleat section 40 and the second cleat section 42 should be sufficiently high to substantially restrict the objects from unintentionally moving over the first cleat section 40 and/or the second cleat section 42.

In certain embodiments, the height of the first cleat section 40 and the second cleat section 42 is at least about 5 percent of a height of the objects 52. In other embodiments, the height of the first cleat section 40 and the second cleat section 42 is at least about 10 percent of the height of the objects 52.

While it is illustrated that the first cleat sections 40 all have an approximately equal height, it is possible for at least a portion of the first cleat sections 40 to be formed with a different height using the concepts of the invention. Similar, it is possible for at least a portion of the second cleat sections 42 to be formed with a different height using the concepts of the invention. Additionally, it is possible for the first cleat sections 40 to be formed with a height that is different than the second cleat sections 42.

A person of skill in the art will appreciate that because of the irregular shape of the objects, the terms height, width and length are arbitrary to the orientation of the object 52 at a particular time and changes when the orientation of the object 52 on the conveyor belt 10 changes.

The near end of FIG. 1 illustrates the conveyor belt 10 going around a roller 24, which is identified by two sets of dashed lines. Because the cleats are separated into a plurality of first cleat sections 40 and second cleat sections 42, the first cleat sections 40 pivot away from each other when the conveyor belt 10 is going around the roller 24 and the second cleat sections 42 pivot away from each other when the conveyor belt 10 is going around the roller 24.

This configuration thereby provides a smoother return of the belting 20 and puts less strain on the components of the conveyor belt 10 and thereby enhances the anticipated life of the conveyor belt 10. The cleat configuration of this invention also reduces chatter not only during the movement of the belting 20 but also as the belting 20 passes around the roller 24.

Another benefit of the cleat configuration of this invention is that the cleat configuration reduces rolling resistance of the belting 20, which decreases the horsepower requirements of the motor used to move the belting 20.

In use, the objects 52 are placed onto the conveyor belt 10 and as the conveyor belt 10 is moved, the objects 52 become positioned into the recesses 50. The conveyor belt 10 may be selected with a recess 50 size so that one of the objects 52 is in each of the recesses 50. A substantial portion of each object 52 is in each of the recesses 50 as described above.

As the conveyor belt 10 moves, the first cleat sections 40 and the second cleat sections 42 that define the recesses 50 substantially restrict movement of the objects 52 with respect to the conveyor belt 10. Restricting movement of the objects 52 with respect to the conveyor belt 10 minimizes damage to the objects causes by objects 52 contact each other. Restricting movement of the objects 52 with respect to the conveyor belt 10 also reduces abrasive damage to the surfaces of the belting 20 and the cleats 22 caused by movement of the objects 52.

Additionally, restricting movement of the objects 52 with respect to the conveyor belt 10 increases the amount of objects 52 that may be positioned across the width of the conveyor belt 10 while reducing the potential of the objects falling off the edges of the conveyor belt 10.

In the preceding detailed description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The preceding detailed description, therefore, is not to be taken in a limiting sense, and the scope of the present invention is defined by the appended claims.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. A conveyor belt with flow control cleats comprising:
   belting having a first side edge and a second side edge;
   a first set of cleats comprising a plurality of first cleat sections, wherein the first cleat sections are positioned in alignment with each other to form a first line, wherein a first space is provided between adjacent ends of adjacent first cleat sections and wherein the first line is oriented at a first acute angle with respect to the first side edge; and
   a second set of cleats comprising a plurality of second cleat sections, wherein the second cleat sections are positioned in alignment with each other to form a second line, wherein a second space is provided between adjacent ends of adjacent second cleat sections, wherein the second line is oriented at a second acute angle with respect to the second side edge and wherein when moving in a direction between the first side edge and the second side edge that is substantially perpendicular to the first side edge, the first space is substantially aligned with the second space.

2. The conveyor belt of claim 1, wherein the first acute angle is between about 30 degrees and about 60 degrees with respect to the first side edge and wherein the second acute angle is between about 30 degrees and about 60 degrees with respect to the second side edge.

3. The conveyor belt of claim 1, wherein each of the first cleat sections has a first end and a second end, wherein the first cleat sections are oriented in the first line so that the first ends are adjacent to the second ends, wherein each of the second cleat sections has a first end and a second end and wherein the second cleat sections are oriented in the second line so that the first ends are adjacent to the second ends.

4. The conveyor belt of claim 1, wherein the first cleat sections are oriented approximately perpendicular to the second cleat sections.

5. The conveyor belt of claim 1, wherein each of the first cleat sections has a substantially similar length and wherein each of the second cleat sections has a substantially similar length.

6. The conveyor belt of claim 1, wherein a length of each of the first cleat sections is substantially equal to a length of each of the second cleat sections.

7. The conveyor belt of claim 1, wherein the first space between adjacent ends of adjacent first cleat sections is approximately 10 percent of a length of the first cleat sections and wherein the second space between adjacent ends of adjacent second cleat sections is approximately 10 percent of a length of the second cleat sections.

8. The conveyor belt of claim 1, wherein the conveyor belt comprises:
   a plurality of the first set of cleats mounted in a spaced-apart configuration, wherein the first cleat sections in each of the plurality of the first set of cleats are positioned in alignment with each other to form a plurality of the first lines; and
   a plurality of the second set of cleats mounted in a spaced-apart configuration, wherein the second cleat sections in each of the plurality of the first set of cleats are positioned in alignment with each other to form a plurality of the second lines.

9. The conveyor belt of claim 8, wherein a spacing between each of the plurality of the first lines is approximately equal to a length of one of the second cleat sections and wherein a spacing between each of the plurality of the second lines is approximately equal to a length of one of the first cleat sections.

10. A method of reducing chatter when moving objects using a conveyor belt comprising:
    providing a conveyor belt comprising belting, a first set of cleats and a second set of cleats, wherein the belting has a first side edge and a second side edge, wherein the first set of cleats and the second set of cleats are attached to the belting, wherein the first set of cleats comprise a plurality of first cleat sections, wherein the first cleat sections are positioned in alignment with each other to form a first line and wherein a first space is provided between adjacent ends of adjacent first cleat sections, wherein the first line is oriented at a first acute angle with respect to the first side edge, wherein the second set of cleats comprise a plurality of second cleat sections, wherein the second cleat sections are positioned in alignment with each other to form a second line, wherein a second space is provided between adjacent ends of adjacent second cleat sections, wherein the second line is oriented at a second acute angle with respect to the second side edge and wherein when moving in a direction between the first side edge and the second side edge that is substantially perpendicular to the first side edge, the first space is substantially aligned with the second space;

placing objects on the conveyor belt so that the objects are at least partially on the belting; and moving the conveyor belt with respect to a support structure having a roller at one end over which the conveyor belt passes.

11. The method of claim 10, wherein each of the first cleat sections has a first end and a second end, wherein the first cleat sections are oriented in the first line so that the first ends are adjacent to the second ends, wherein each of the second cleat sections has a first end and a second end and wherein the second cleat sections are oriented in the second line so that the first ends are adjacent to the second ends.

12. The method of claim 10, wherein the first acute angle is between about 30 degrees and about 60 degrees with respect to the first side edge and wherein the second acute angle is between about 30 degrees and about 60 degrees with respect to the second side edge.

13. The method of claim 10, and further comprising:
orienting the first set of cleats approximately perpendicular to the second set of cleats.

14. The method of claim 10, and further comprising:
forming each of the first cleat sections with a substantially similar length and forming each of the second cleat sections with a substantially similar length;
forming each of the first cleat sections with a length that is substantially equal to a length of each of the second cleat sections;
forming the first space between adjacent ends of adjacent first cleat sections approximately 10 percent of a length of the first cleat sections; and
forming the second space between adjacent ends of adjacent second cleat sections approximately 10 percent of a length of the second cleat sections.

15. The method of claim 10, and further comprising
providing a plurality of the first set of cleats mounted in a spaced-apart configuration, wherein the first cleat sections in each of the plurality of the first set of cleats are positioned in alignment with each other to form a plurality of the first lines; and
providing a plurality of the second set of cleats mounted in a spaced-apart configuration, wherein the second cleat sections in each of the plurality of the first set of cleats are positioned in alignment with each other to form a plurality of the second lines.

16. The method of claim 15, wherein a spacing between each of the plurality of the first lines is approximately equal to a length of one of the second cleat sections and wherein a spacing between each of the plurality of the second lines is approximately equal to a length of one of the first cleat sections.

17. A method of decreasing roll resistance when moving objects using a conveyor belt comprising:
providing a conveyor belt comprising belting, a first set of cleats and a second set of cleats, wherein the belting has a first side edge and a second side edge, wherein the first set of cleats and the second set of cleats are attached to the belting, wherein the first set of cleats comprise a plurality of first cleat sections, wherein the first cleat sections are positioned in alignment with each other to form a first line and wherein a first space is provided between adjacent ends of adjacent first cleat sections, wherein the first line is oriented at a first acute angle with respect to the first side edge, wherein the second set of cleats comprise a plurality of second cleat sections, wherein the second cleat sections are positioned in alignment with each other to form a second line, wherein a second space is provided between adjacent ends of adjacent second cleat sections, wherein the second line is oriented at a second acute angle with respect to the second side edge and wherein when moving in a direction between the first side edge and the second side edge that is substantially perpendicular to the first side edge, the first space is substantially aligned with the second space;

placing objects on the conveyor belt so that the objects are at least partially on the belting; and moving the conveyor belt with respect to a support structure having a roller at one end over which the conveyor belt passes.

18. The method of claim 17, wherein each of the first cleat sections has a first end and a second end, wherein the first cleat sections are oriented in the first line so that the first ends are adjacent to the second ends, wherein each of the second cleat sections has a first end and a second end and wherein the second cleat sections are oriented in the second line so that the first ends are adjacent to the second ends.

19. The method of claim 17, and further comprising:
providing a plurality of the first set of cleats mounted in a spaced-apart configuration, wherein the first cleat sections in each of the plurality of the first set of cleats are positioned in alignment with each other to form a plurality of the first lines; and
providing a plurality of the second set of cleats mounted in a spaced-apart configuration, wherein the second cleat sections in each of the plurality of the first set of cleats are positioned in alignment with each other to form a plurality of the second lines.

20. The method of claim 19, wherein a spacing between each of the plurality of the first lines is approximately equal to a length of one of the second cleat sections and wherein a spacing between each of the plurality of the second lines is approximately equal to a length of one of the first cleat sections.

* * * * *